United States Patent
Debbasch et al.

(10) Patent No.: US 11,070,420 B2
(45) Date of Patent: Jul. 20, 2021

(54) SYSTEM, DEVICE, AND METHOD FOR CONFIGURING THE HANDLING OF EVENTS

(71) Applicant: Pacific Track, LLC, Newport Beach, CA (US)

(72) Inventors: Bernard O. Debbasch, Newport Beach, CA (US); Daniel P. Rothman, Fountain Valley, CA (US)

(73) Assignee: PACIFIC TRACK, LLC, Newport Beach, CA (US)

( * ) Notice: Subject to any disclaimer, the term of this patent is extended or adjusted under 35 U.S.C. 154(b) by 0 days.

(21) Appl. No.: 16/570,714

(22) Filed: Sep. 13, 2019

(65) Prior Publication Data

US 2021/0083930 A1    Mar. 18, 2021

(51) Int. Cl.
| | | |
|---|---|---|
| G06F 8/34 | (2018.01) | |
| H04L 12/24 | (2006.01) | |
| G06F 9/455 | (2018.01) | |
| G06F 8/41 | (2018.01) | |
| G06F 8/65 | (2018.01) | |

(52) U.S. Cl.
CPC ............ *H04L 41/0681* (2013.01); *G06F 8/34* (2013.01); *G06F 8/47* (2013.01); *G06F 8/65* (2013.01); *G06F 9/45516* (2013.01); *H04L 41/069* (2013.01); *H04L 41/082* (2013.01); *H04L 41/22* (2013.01)

(58) Field of Classification Search
CPC ..... G06F 8/34; G06F 8/47; G06F 8/65; G06F 9/45516; H04L 41/0681; H04L 41/069; H04L 41/082; H04L 41/22
USPC ......................................................... 717/113
See application file for complete search history.

(56) References Cited

U.S. PATENT DOCUMENTS

| | | | |
|---|---|---|---|
| 7,478,405 B2 | 1/2009 | Hinson et al. | |
| 9,652,307 B1 | 5/2017 | Soman et al. | |
| 9,928,103 B1* | 3/2018 | Lau et al. | G06F 9/465 |
| 10,270,734 B2 | 4/2019 | Lawson et al. | |
| 2002/0029357 A1* | 3/2002 | Charnell et al. | G06F 9/45516 714/5.11 |
| 2004/0216136 A1 | 10/2004 | Laschkewitsch et al. | |
| 2014/0295870 A1 | 10/2014 | Wendland et al. | |
| 2014/0359558 A1 | 12/2014 | Chamberlain | |

(Continued)

*Primary Examiner* — Wei Y Zhen
*Assistant Examiner* — Mohammed N Huda
(74) *Attorney, Agent, or Firm* — Olav M. Underdal; IDP Patent Services (57) ABSTRACT

A system for distributed device event handler configuration includes an event handler configuration server, including: a processor, a non-transitory memory, an input/output component, a visual program editor, a logical event model, and a device communicator; event management devices, each including: a hardware layer/operating system, a logical event mapping, a target compiler, a program executor; such that a configuration user can edit an event handling program, comprising event handlers, which handle device events on the event management devices; such that an event management device executes an event handler, when the event management device detects a device event, which corresponds with the event handler. Also disclosed is a method for distributed device event handler configuration, including editing an event handling program, updating devices, detecting a device event, and executing an event handler.

14 Claims, 7 Drawing Sheets

System for Distributed Device Event Handler Configuration (56) References Cited

U.S. PATENT DOCUMENTS

| | | |
|---|---|---|
| 2017/0068578 A1 | 3/2017 | Janarthanam et al. |
| 2018/0164401 A1 | 6/2018 | Hergesheimer |
| 2019/0012218 A1 | 1/2019 | Rimac et al. |
| 2019/0140886 A1 | 5/2019 | Zywicki et al. |
| 2019/0191368 A1 | 6/2019 | Ramiah et al. |

* cited by examiner

FIG. 1

System for Distributed Device Event Handler Configuration

FIG. 2

FIG. 4
Application View

FIG. 5
Method for Distributed Device Event Handler Configuration

FIG. 6
Logical Event Model

FIG. 7
Logical Event Mapping

314

| Logical Event | Logical Event Action | Device Event | Device Event Action |
|---|---|---|---|
| LE1 | LE1A1 | DE1 | DE1A1 |
| LE1 | LE1A2 | DE1 | DE1A2 |
| LE2 | LE2A1 | DE2 | DE2A1 |

614   616   714   716

SYSTEM, DEVICE, AND METHOD FOR CONFIGURING THE HANDLING OF EVENTS

CROSS-REFERENCE TO RELATED APPLICATIONS

N/A.

FIELD OF THE INVENTION

The present invention relates generally to the field of telematics and Internet of Things device configuration, and more particularly to methods and systems for customized event handler configuration for distributed devices.

BACKGROUND OF THE INVENTION

In the field of telematics, devices are used to remotely track, monitor or control vehicles, or more generally points of presence, as well as monitor vehicles operating conditions for maintenance purposes and monitor driver behavior. Very often these devices are connected to a monitoring/controlling entity, such as a telematics server, over a local area network (LAN) or a wide area network (WAN), such as the Internet. Such connections can be direct if the device has a direct connection to the network (one example is if the device includes a cellular modem) or indirect if the device communicates (wired or wirelessly) with another device which provides a relay function towards the larger network.

In order to optimize the cost and size, such devices are generally controlled by a simple microprocessor or microcontroller, which takes care of the local monitoring as well as interfacing with the control end point. In some cases, a single processor handles the local processing and the complex management of the cellular communication subsystem.

These devices have been traditionally controlled with what the industry calls AT commands. The AT commands were initially introduced to control the Hayes analog modem. Since then, the original AT commands have been extended by standardization bodies (such as ETSI/3GPP) or companies promoting their own proprietary commands. Generally, AT commands have been used to set the configuration of the device. For example, an AT command may tell the device how often it should report its status over the network.

Some manufacturers have tried to improve the capability of these devices by integrating a simple scripting engine in the device. The scripting engine allows the user to conditionally control the behavior of the device based on triggers and/or timers. These scripts are generally designed using AT commands or similar types of commands, and when running on the intended target devices can substantially reduce the need for a server to frequently check with the device or for the device to frequently communicate with the server. This is achieved by analyzing and capturing the transitional events on the device instead of looking for those transitions in a large flow of data retrieved or received by the server.

However, the process of writing these scripts is time-consuming and generally requires specialized skill to translate the desired behavior into a complex set of commands, which have to be specifically coded for the intended target devices.

As such, considering the foregoing, it may be appreciated that there continues to be a need for novel and improved devices and methods for customized event handler configuration for distributed devices.

SUMMARY OF THE INVENTION

The foregoing needs are met, to a great extent, by the present invention, wherein in aspects of this invention, enhancements are provided to the existing model of customized event handler configuration for distributed devices In an aspect, a system for distributed device event handler configuration can include:
  a) an event handler configuration server; and
  b) a plurality of event management devices, which are connected with the event handler configuration server over a network;
  wherein the event handler configuration server enables a configuration user to edit an event handling program, including at least one event handler, which handles events on at least one event management device in the plurality of event management devices;
  wherein the event handler configuration server updates the at least one event management device with the event handling program, such that the at least one event management device executes the event handling program.

In a related aspect, the event handler configuration server can include:
  a) A processor;
  b) A non-transitory memory;
  c) An input/output component;
  d) A visual program editor, which is configured to edit a graphical representation of the event handling program, such that the visual program editor generates the event handling program from the graphical representation;
  e) A logical event model, which includes a plurality of logical events and for each logical event a plurality of logical event actions,
    such that the event handling program references at least one selected logical event from the plurality of logical events, along with at least one selected logical event action from the plurality of logical event actions; and
  f) A device communicator, which communicates with the event management devices; all connected via
  g) A data bus.

In a related aspect, the event management device can include:
  a) A processor;
  b) A non-transitory memory;
  c) An input/output component;
  d) A device manager, which can download and store the event handling program;
  e) A hardware layer/operating system, which provides access to hardware resources, including device events and device event actions;
  f) A logical event mapping, which maps each logical event to a device event from the hardware layer/operating system, and maps each corresponding logical event action to a corresponding device event action provided by the hardware layer/operating system;
  g) A target compiler, which is configured to compile the event handling program into an event handling executable object for execution on the at least one event management device,
    such that the target compiler is configured to use the logical event mapping to replace logical events and associated logical event actions with corresponding device events and corresponding associated event actions; and h) A program executor, which is configured to execute the event handling executable object, or in some related embodiments directly interpret the event handling program, such that the event handling executable object is the event handling program; all connected via i) A data bus.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. In addition, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION

Before describing the invention in detail, it should be observed that the present invention resides primarily in a novel and non-obvious combination of elements and process steps. So as not to obscure the disclosure with details that will readily be apparent to those skilled in the art, certain conventional elements and steps have been presented with lesser detail, while the drawings and specification describe in greater detail other elements and steps pertinent to understanding the invention.

The following embodiments are not intended to define limits as to the structure or method of the invention, but only to provide exemplary constructions. The embodiments are permissive rather than mandatory and illustrative rather than exhaustive.

In the following, we describe the structure of an embodiment of a system for distributed device event handler configuration 100 with reference to FIG. 1, in such manner that like reference numerals refer to like components throughout; a convention that we shall employ for the remainder of this specification.

Figure 1:
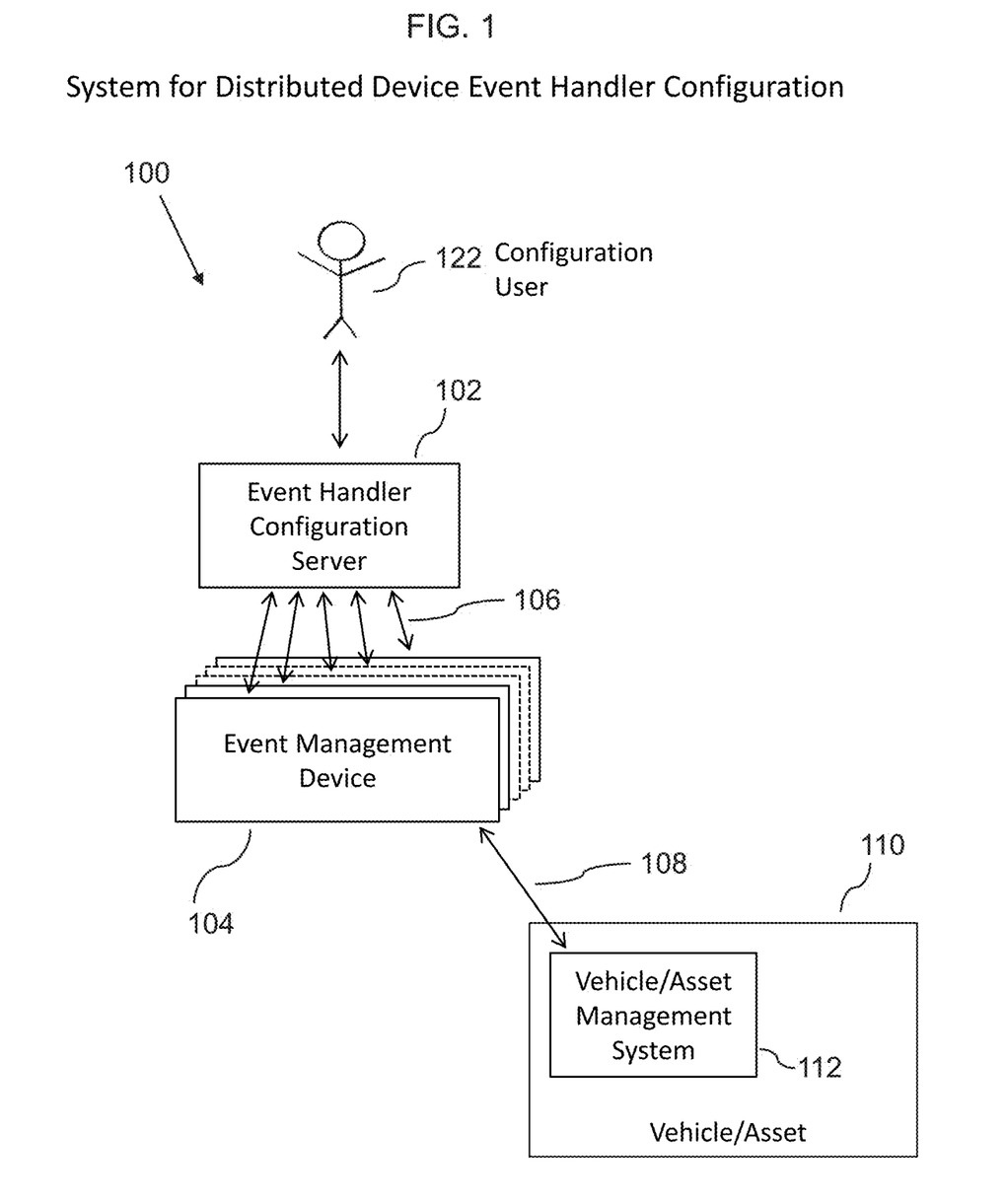
FIG. 1 is a schematic diagram illustrating a system for distributed device event handler configuration, according to an embodiment of the invention.

In an embodiment, as shown in FIG. 1, a system for distributed device event handler configuration 100 can include:

a) an event handler configuration server 102; and
b) a plurality of event management devices 104, which are connected with the event handler configuration server 102 over a network 106;
wherein the event handler configuration server 102 is configured to enable a configuration user 122 to create and edit an event handling program, including at least one event handler, which is configured to handle events on at least one event management device 104 in the plurality of event management devices 104;
wherein the event handler configuration server 102 is configured to update the at least one event management device 104 with the event handling program, such that the at least one event management device 104 executes the event handling program.

Figure 2:
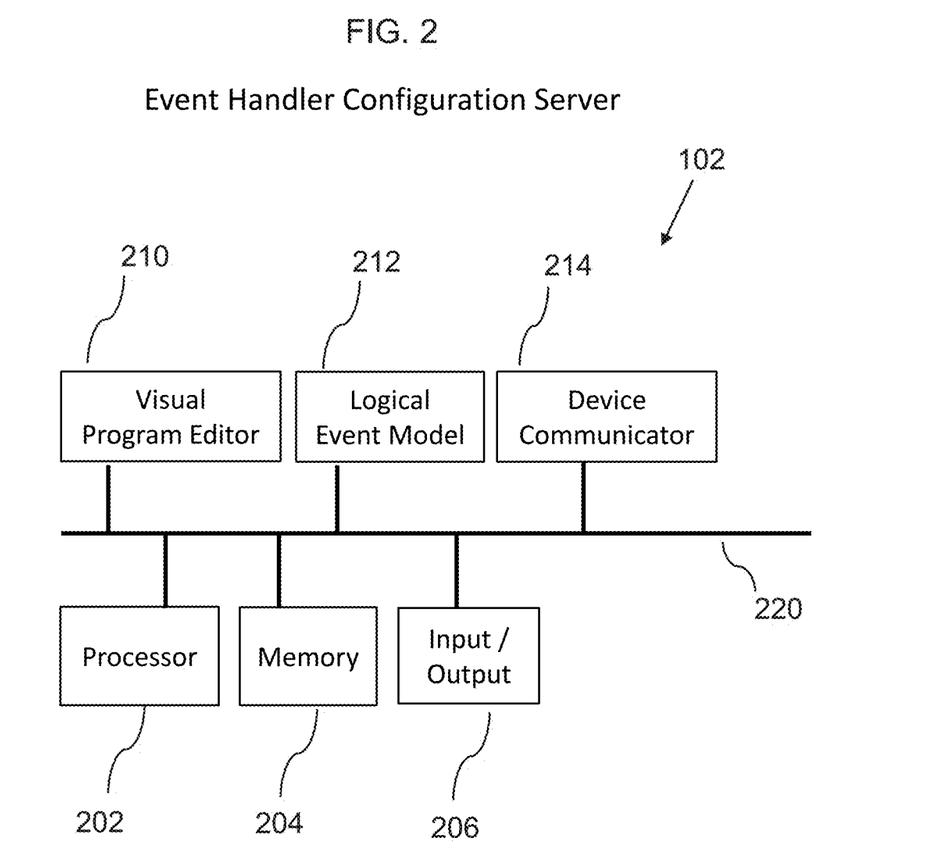
FIG. 2 is a schematic diagram illustrating an event handler configuration server, according to an embodiment of the invention.
Figure 6:
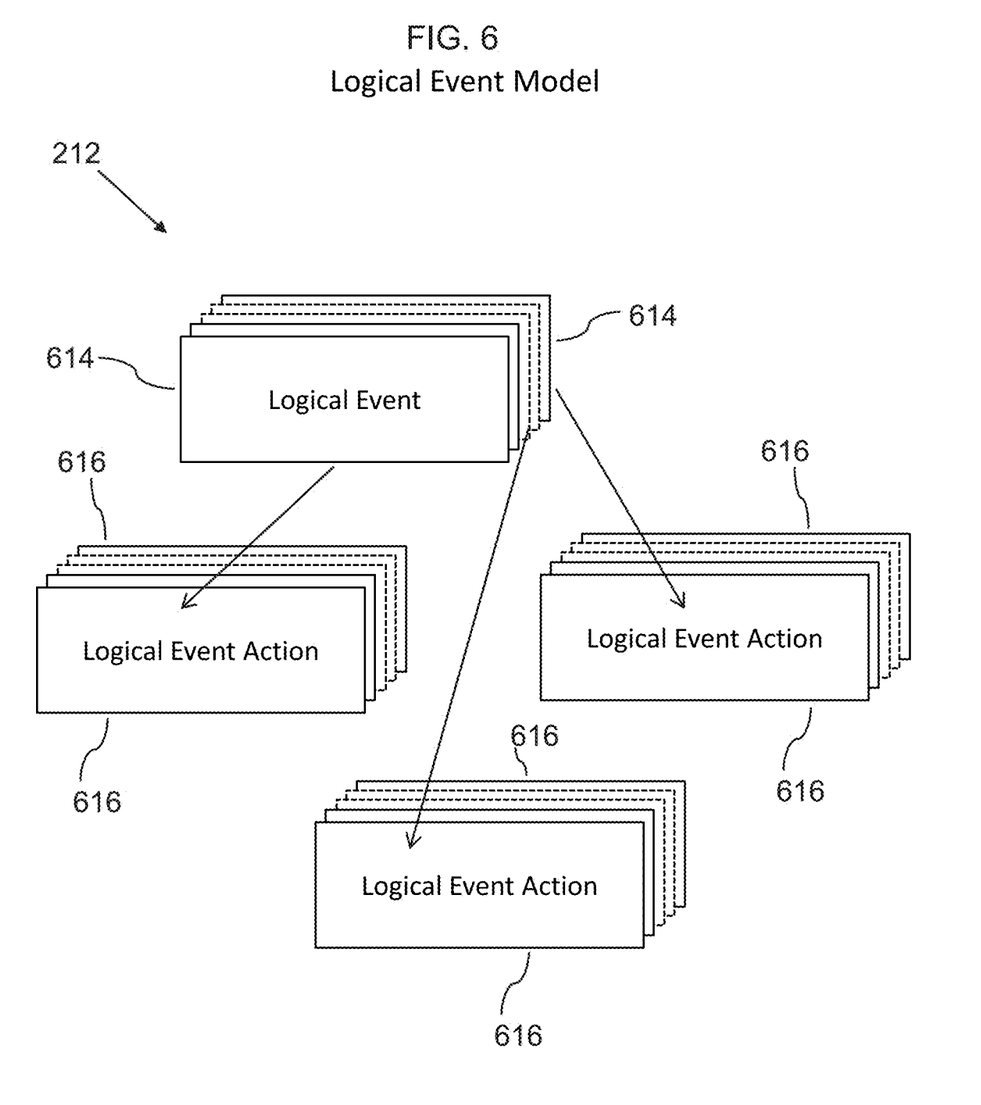
FIG. 6 is a schematic diagram illustrating a logical event model, according to an embodiment of the invention.

In a related embodiment, the event handler configuration server 102 can include:

a) A processor 202;
b) A non-transitory memory 204;
c) An input/output component 206;
d) A program editor 210, which can be a visual program editor 210 that is configured to edit a graphical representation of the event handling program, such that the visual program editor 210 generates the event handling program from the graphical representation;
e) A logical event model 212, as shown in FIGS. 2 and 6, which comprises a plurality of logical events 614, each logical event 614 comprising a plurality of available logical event actions 616 (or at least one available logical event action),
such that the event handling program references at least one selected logical event 614 from the plurality of logical events logical events 614, along with at least one selected logical event action 616 from the plurality of available logical event actions 616 (or from the at least one logical event action 616);
f) A device communicator 214, which is configured to communicate with the event management devices 104; all connected via
g) A data bus 220.

Figure 3:
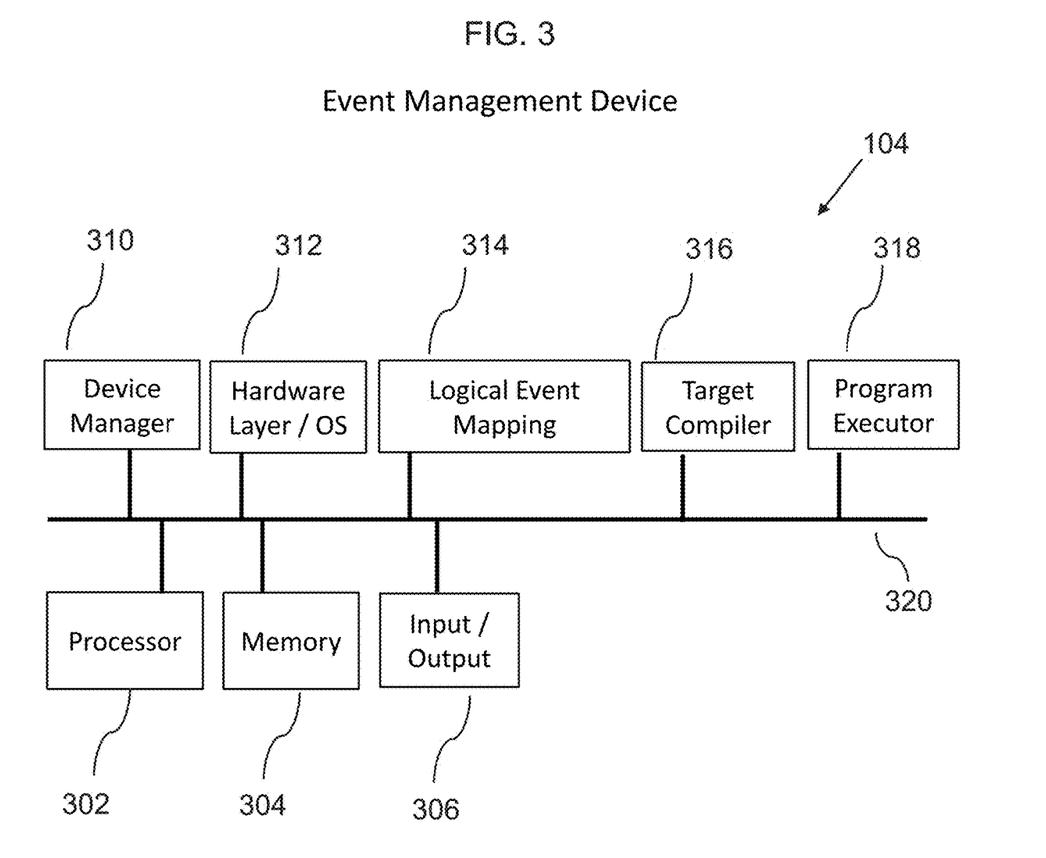
FIG. 3 is a schematic diagram illustrating an event management device, according to an embodiment of the invention.
Figure 7:
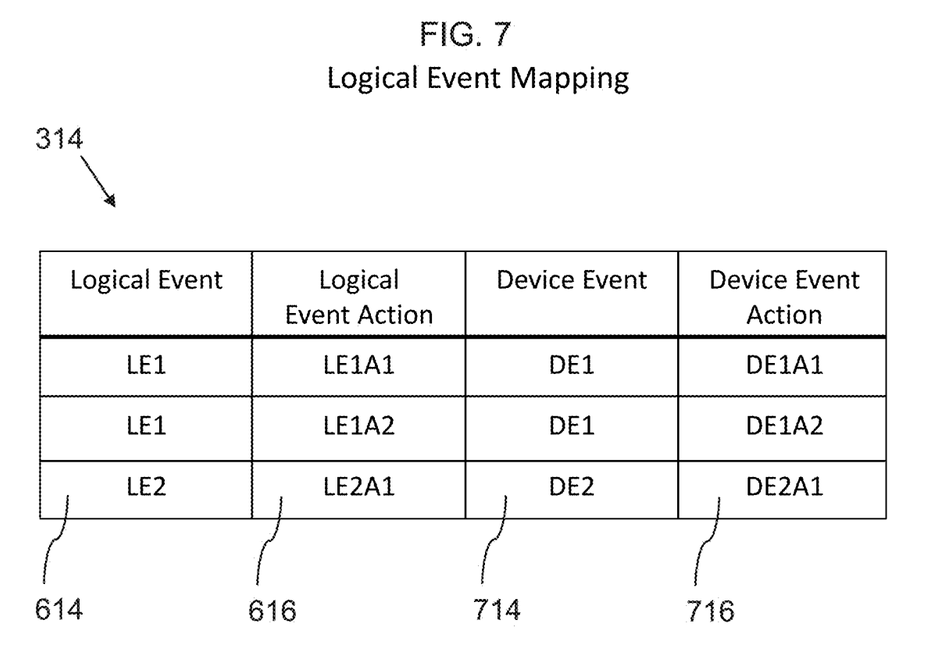
FIG. 7 is a schematic diagram illustrating a logical event mapping, according to an embodiment of the invention.

In a related embodiment, the event management device 104 can include:

a) A processor 302;
b) A non-transitory memory 304;
c) An input/output component 306;
d) A device manager 310, which can download and store the event handling program;
e) A hardware layer/operating system 312, which provides access to hardware resources, including device events and corresponding device event actions;

f) A logical event mapping 314, as shown in FIGS. 3 and 7, which maps each logical event 614 to an associated device event 714 from the hardware layer/operating system, and maps each corresponding logical event action 616 to a corresponding device event action 716 provided by the hardware layer/operating system. As shown in FIG. 7, the logical event mapping 314 can be implemented as a logical event mapping table 314 with fields and rows to denote the mapping from logical event/actions 614, 616 to device events/actions 714, 716;

g) A target compiler 316, which is configured to compile the event handling program into an event handling executable object for execution on the at least one event management device 104, such that the target compiler 316 is configured to use the logical event mapping 314 to replace each logical event 614 with the associated device event 714 and each corresponding logical event action 616 with the corresponding device event action 716; and h) A program executor 318, which is configured to execute the event handling executable object, or in some related embodiments directly interpret the event handling program, such that the event handling executable object is the event handling program; all connected via i) A data bus 320.

In a related embodiment, the event handling executable object can be binary machine code, such as X86 or ARM™ machine code, which is directly executable by the processor 302, such that the program executor directly executes the event handling executable object on the event management device.

In another related embodiment, the event handling executable object can be an intermediate code object, such a JAVA™ virtual machine bytecode or C#™ Common Intermediate Language, or another form of virtual machine intermediate code, such that the program executor performs a just-in-time compilation of the event handling executable object for execution on the event management device.

In another related embodiment, the program executor can interpret (i.e. interprets) the event handling executable object at run-time.

In a related embodiment, the system for distributed device event handler configuration 100 can provide an easy-to-master, convenient, and efficient method for configuration users 122 to configure devices 104 to respond to various external events in various ways.

In various related embodiments, the system for distributed device event handler configuration 100 can be applied to a cellular telematics device used in vehicles (such as cars, trucks, etc.) and in other mobile and fixed assets such as truck trailers. The system for distributed device event handler configuration 100 can allow users 122 to configure individual devices to respond in customized ways (such as sending a message, triggering a vehicle 110 sub-system 112 to do something, in response to specific events (including events in vehicles 110, such as engine status, etc., and events in the environment, such as temperature). Events can be related to the vehicle/asset 110 itself, such as engine status, or not part of the vehicle/asset 110 itself, such as the temperature in a trailer or driver behavior. Included events are the intersection of what the device is capable of monitoring/measuring/determining, what the vehicle/asset 110 and environment are capable of providing, and which events among that intersection are predetermined as relevant for coverage by an event handler. The events are generally based on hardware state transitions in the vehicle/asset 110 (for example an engine is started), external events (for example the GPS sub-system gets unlocked) or periodic (based on a timer).

In a related embodiment, the event management device 104 can communicate with a vehicle/asset management system 112 of a vehicle/asset 110, in order to receive system information and event notifications. The event management device 104 can communicate with the vehicle/asset management system 112 via a local area network 108, which for example can use a CAN-based (OBD-II or J1939) or J1708/J1587 or J1850 communication protocol when the vehicle/asset 110 is a vehicle 110.

In various related embodiments, the system for distributed device event handler configuration 100 allows a device 104 (and plurality of devices 104) to be used as a tracking, monitoring or controlling entity (point of presence) to execute powerful rules without requiring the user to learn a specific programming language and while keeping the processing and memory resources overhead inside of the device extremely small.

In a related embodiment, the event management device can include a program executor 318, which implements a simple programming language for the device 104. An example of such language can be a subset of the BASIC™ language. This subset can easily be implemented in small devices such as the ones targeted by this invention. The simple language includes all the control logic needed for an elementary programming language, such as IF <condition> THEN <statement 1> ELSE <statement 2>, etc. Alternatively, the language can be a lower level compiled language such as a byte code language, which can be just-in-time compiled or interpreted by the program executor 318.

In a related embodiment, the configuration user 122 can create the application using the visual program editor 210 of the event handler configuration server 102, such that the user can create the event handling program using a graphical representation, and thereby will not have to directly program in the underlying programing language.

In a related embodiment, various well-known graphical interfaces for application development can be used to implement the visual program editor 210, such as for example BLOCKLY™ developed by GOOGLE™.

In a further related embodiment, the event management device 104 can be configured to receive/intercept state transitions received via the hardware layer/Operating System 312, such that a corresponding action in the event handling program is invoked, if the event handling program includes an entry point associated with this state transition. For example, when the device detects that a digital input has transitioned from one level to another, it can attempt to locate the onLevelChange entry point in the event handling program. If this entry point is present, the device would execute the corresponding user instructions and then return to the normal device processing. Generally, except for an eventual initialization phase, the device 104 does not continuously run any event handling program. The event handling program only executes when a state transition is detected, and a corresponding entry point is present in the user program.

In a related embodiment, the device communicator 214 of the event handler configuration server 102 can be configured to make the event handling program available for download onto the event management device 104.

In a further related embodiment, the device manager 310 of the event management device 104 can periodically check (i.e. be configured to poll) the event handler configuration server 102 and download the event handling program, when the event handling program is updated or newly created.

In another further related embodiment, the device manager 310 can store a plurality of preprogrammed event handling programs that allow the configuration user 122 to easily manage the behavior of the device 104.

In a related embodiment, the configuration user 122 can access the event handler configuration server 102 via a web browser app or some other form of graphical user interface.

In a related embodiment, if an event handler is found to exist, the device 104 executes machine code to implement an action (such as turning on a buzzer, flashing an LED, communicating information over the cellular connection, etc.).

Figure 4:
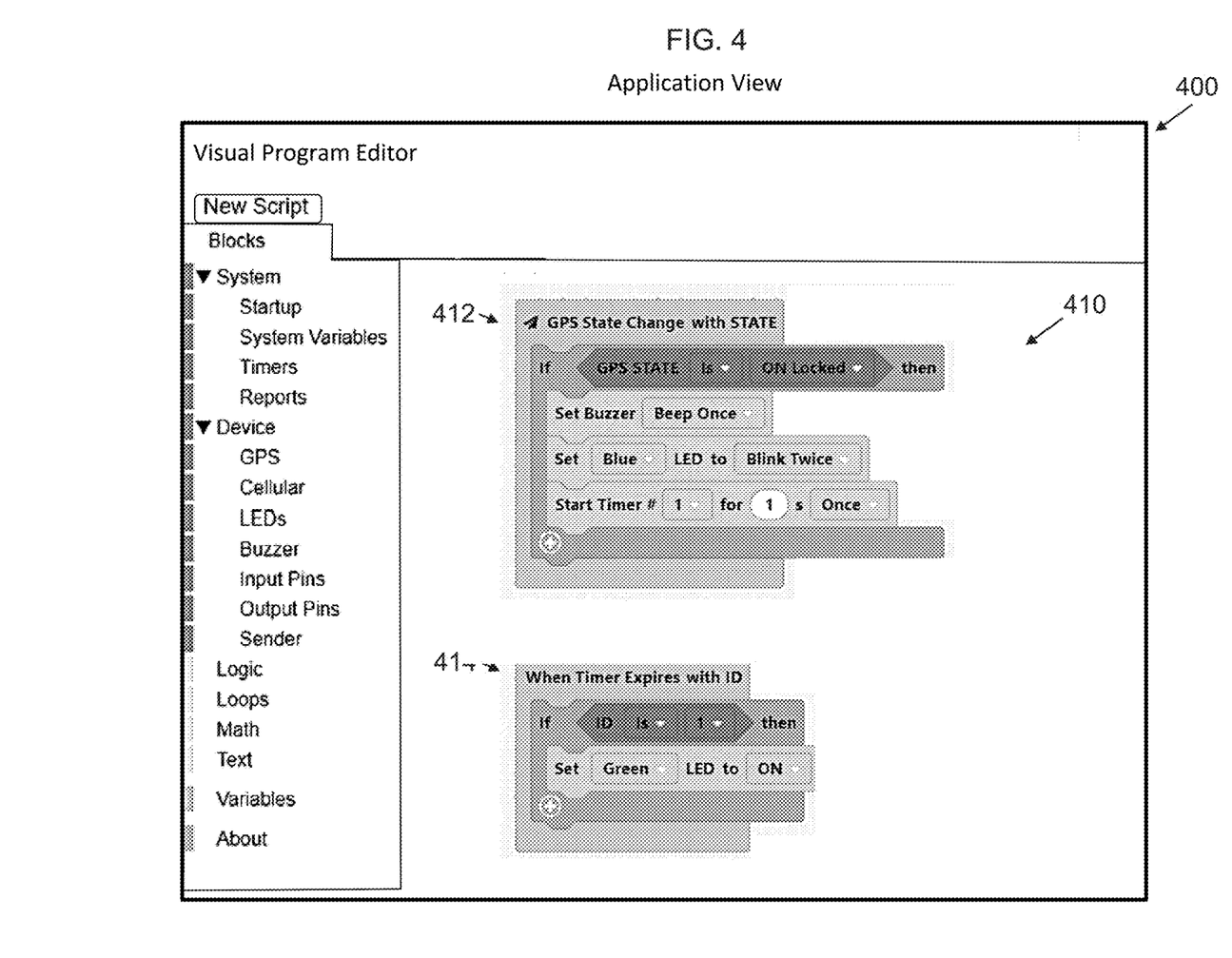
FIG. 4 is an illustration of a graphical user interface of the event handler configuration server, according to an embodiment of the invention.

In a related embodiment, FIG. 4 shows a graphical user interface 400 for the visual program editor 210, showing a graphical representation of an event handling program 410, comprising a first event handler 412 and a second event handler 414.

In a further related example embodiment, the visual program editor 210 can generate the following event handler 412 (in a BASIC type language) from the graphical representation of the first event handler 412:

```
SUB onGP _gState
    IF _gState = 1 THEN
        sBZ(2)
        sLD(3,3)
        sTM_S(1,1000,0)
    END IF
END SUB.
```

In another further related example embodiment, the visual program editor 210 can generate the following event handler 414 (in a BASIC type language) from the graphical representation of the second event handler 414:

```
SUB onTM _tid
    IF _tid = 1 THEN
        sLD(2,1)
    END IF
END SUB
```

In another related example embodiment, the visual program editor 210 can be configured to calculate dynamically the amount of data that a user program would consume over a period of time (for example one month). This feature allows the user to control and optimize in real time the amount of data consumed by the device if that user program is pushed to the device. With this feature, users can anticipate the amount of data that will be consumed over the target network (for example a cellular network). Alternatively, the user can adjust the design to stay within an already set data plan.

In related embodiments, the event management device 104 can include configurations as:
a) A web application, executing in a Web browser;
b) A tablet app, executing on a tablet device, such as for example an Android or iOS tablet device;
c) A mobile app, executing on a mobile device, such as for example an Android phone or iPhone, or any wearable mobile device;
d) A desktop application, executing on a personal computer, or similar device; or
e) An embedded application, executing on a processing device, such as for example an embedded device mounted in a vehicle 110.

It shall be understood that an executing instance of an embodiment of the system for distributed device event handler configuration 100, as shown in FIG. 1, can include a plurality of event management devices 104, which are each tied to a vehicle 110 or other asset 110.

Figure 5:
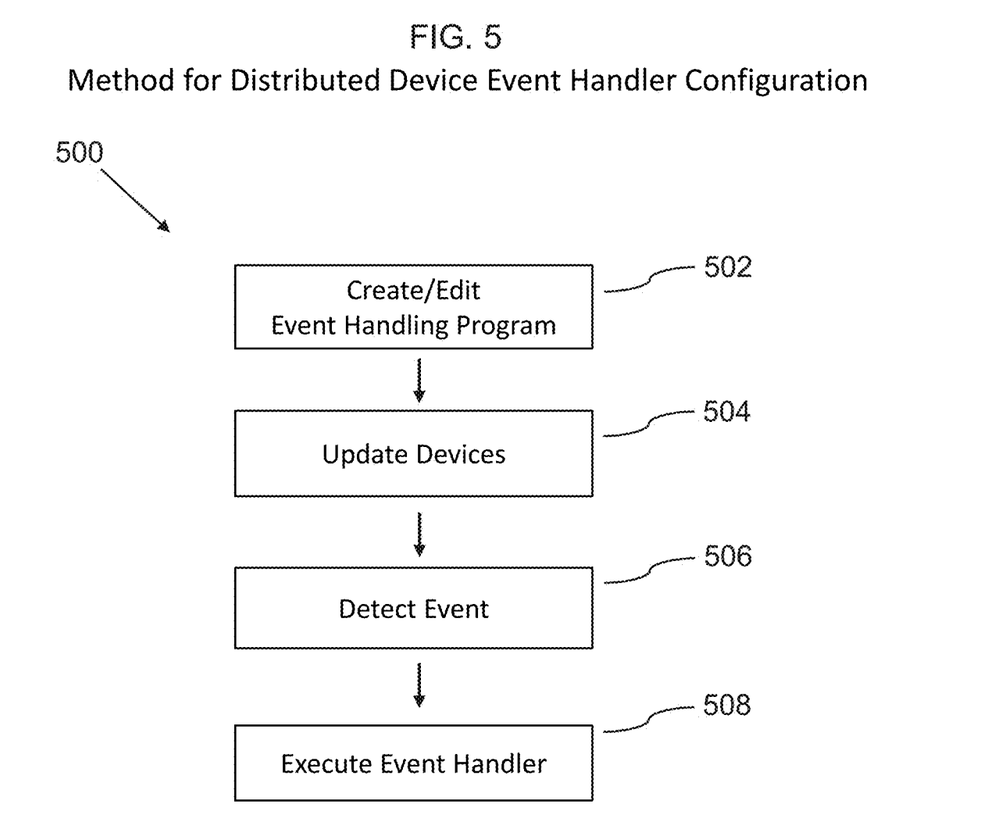
FIG. 5 is a flowchart illustrating steps that may be followed, in accordance with one embodiment of a method or process of event handler configuration.

In an embodiment, as illustrated in FIG. 5, a method for distributed device event handler configuration 500, can include:
a) Editing an event handling program 502, wherein an event handler configuration server is used to create and edit the event handling program, comprising at least one event handler, which is configured to handle device events on at least one event management device;
b) Updating devices 504, wherein the event handler configuration server updates the at least one event management device with the event handling program;
c) Detecting a device event 506, wherein the at least one event management device detects a device event, which corresponds with the at least one event handler of the event handling program; and
d) Executing an event handler 508, wherein the at least one event management device executes the at least one event handler.

FIGS. 1, 2, 3, 4, 5, 6, and 7 are block diagrams and flowcharts, methods, devices, systems, apparatuses, and computer program products according to various embodiments of the present invention. It shall be understood that each block or step of the block diagram, flowchart and control flow illustrations, and combinations of blocks in the block diagram, flowchart and control flow illustrations, can be implemented by computer program instructions or other means. Although computer program instructions are discussed, an apparatus or system according to the present invention can include other means, such as hardware or some combination of hardware and software, including one or more processors or controllers, for performing the disclosed functions.

In this regard, FIGS. 1, 2, and 3 depict the computer devices of various embodiments, each containing several of the key components of a general-purpose computer by which an embodiment of the present invention may be implemented. Those of ordinary skill in the art will appreciate that a computer can include many components. However, it is not necessary that all of these generally conventional components be shown in order to disclose an illustrative embodiment for practicing the invention. The general-purpose computer can include a processing unit and a system memory, which may include various forms of non-transitory storage media such as random access memory (RAM) and read-only memory (ROM). The computer also may include nonvolatile storage memory, such as flash memory (FLASH) or a hard disk drive, where additional data can be stored.

FIG. 1 shows a depiction of an embodiment of the system for distributed device event handler configuration 100, including the event handler configuration server 102, and the event management devices 104. In this relation, a server shall be understood to represent a general computing capability that can be physically manifested as one, two, or a plurality of individual physical computing devices, located at one or several physical locations. A server can for example be manifested as a shared computational use of one single desktop computer, a dedicated server, a cluster of rack-mounted physical servers, a datacenter, or network of datacenters, each such datacenter containing a plurality of physical servers, or a computing cloud, such as AMAZON EC2™ or MICROSOFT AZURE™.

It shall be understood that the above-mentioned components of the event handler configuration server 102, and the event management devices 104 are to be interpreted in the most general manner.

For example, the processors 202 302 can each respectively include a single physical microprocessor or microcontroller, a cluster of processors, a datacenter or a cluster of datacenters, a computing cloud service, and the like.

In a further example, the non-transitory memory 204 and the non-transitory memory 304 can each respectively include various forms of non-transitory storage media, including random access memory and other forms of dynamic storage, and hard disks, hard disk clusters, cloud storage services, and other forms of long-term storage. Similarly, the input/output 206 and the input/output 306 can each respectively include a plurality of well-known input/output devices, such as screens, keyboards, pointing devices, motion trackers, communication ports, digital and analog input and output, temperature sensors, and so forth.

Furthermore, it shall be understood that the event handler configuration server 102, and the event management devices 104 can each respectively include a number of other components that are well known in the art of general computer devices, and therefore shall not be further described herein. This can include system access to common functions and hardware, such as for example via operating system layers such as WINDOWS™, LINUX™, and similar operating system software, but can also include configurations wherein application services are executing directly on server hardware or via a hardware abstraction layer other than a complete operating system.

An embodiment of the present invention can also include one or more input or output components, such as a mouse, keyboard, monitor, and the like. A display can be provided for viewing text and graphical data, as well as a user interface to allow a user to request specific operations. Furthermore, an embodiment of the present invention may be connected to one or more remote computers via a network interface. The connection may be over a local area network (LAN) wide area network (WAN), and can include all of the necessary circuitry for such a connection.

In a related embodiment, the event management devices 104 communicate with the event handler configuration server 102 over a network 106, which can include the general Internet, a Wide Area Network or a Local Area Network, or another form of communication network, transmitted on wired or wireless connections. Wireless networks can for example include Cellular Network, Wi-Fi, BLUETOOTH™, ZIGBEE™, and NFC. The communication can be transferred via a secure, encrypted communication protocol.

Typically, computer program instructions may be loaded onto the computer or other general-purpose programmable machine to produce a specialized machine, such that the instructions that execute on the computer or other programmable machine create means for implementing the functions specified in the block diagrams, schematic diagrams or flowcharts. Such computer program instructions may also be stored in a computer-readable medium that when loaded into a computer or other programmable machine can direct the machine to function in a particular manner, such that the instructions stored in the computer-readable medium produce an article of manufacture including instruction means that implement the function specified in the block diagrams, schematic diagrams or flowcharts.

In addition, the computer program instructions may be loaded into a computer or other programmable machine to cause a series of operational steps to be performed by the computer or other programmable machine to produce a computer-implemented process, such that the instructions that execute on the computer or other programmable machine provide steps for implementing the functions specified in the block diagram, schematic diagram, flowchart block or step.

Accordingly, blocks or steps of the block diagram, flowchart or control flow illustrations support combinations of means for performing the specified functions, combinations of steps for performing the specified functions and program instruction means for performing the specified functions. It will also be understood that each block or step of the block diagrams, schematic diagrams or flowcharts, as well as combinations of blocks or steps, can be implemented by special purpose hardware-based computer systems, or combinations of special purpose hardware and computer instructions, that perform the specified functions or steps.

As an example, provided for purposes of illustration only, a data input software tool of a search engine application can be a representative means for receiving a query including one or more search terms. Similar software tools of applications, or implementations of embodiments of the present invention, can be means for performing the specified functions. For example, an embodiment of the present invention may include computer software for interfacing a processing element with a user-controlled input device, such as a mouse, keyboard, touch screen display, scanner, or the like. Similarly, an output of an embodiment of the present invention may include, for example, a combination of display software, video card hardware, and display hardware. A processing element may include, for example, a controller or microprocessor, such as a central processing unit (CPU), arithmetic logic unit (ALU), or control unit.

Here has thus been described a multitude of embodiments of the system for distributed device event handler configuration 100, and methods related thereto, which can be employed in numerous modes of usage.

The many features and advantages of the invention are apparent from the detailed specification, and thus, it is intended by the appended claims to cover all such features and advantages of the invention, which fall within the true spirit and scope of the invention.

For example, alternative embodiments can reconfigure or combine the components of the event handler configuration server 102, and the event management devices 104. The components of the event handler configuration server 102 can be distributed over a plurality of physical, logical, or virtual servers. Parts or all of the components of the event management device 104 can be configured to operate in the event handler configuration server 102, whereby the event management device 104 for example can function as a thin client, performing only graphical user interface presentation and input/output functions. Alternatively, parts or all of the components of the event handler configuration server 102 can be configured to operate in the event management device 104.

Many such alternative configurations are readily apparent, and should be considered fully included in this specification and the claims appended hereto. Accordingly, since numerous modifications and variations will readily occur to those skilled in the art, the invention is not limited to the exact construction and operation illustrated and described, and thus, all suitable modifications and equivalents may be resorted to, falling within the scope of the invention.

What is claimed is:

1. A system for distributed device event handler configuration, comprising:
   a) an event handler configuration server; and
   b) a plurality of event management devices, which are connected with the event handler configuration server over a network;
   wherein the event handler configuration server is configured to enable a configuration user to create and edit an event handling program, comprising at least one event handler, which is configured to handle device events on at least one event management device in the plurality of event management devices;
   wherein the event handler configuration server is configured to update the at least one event management device with the event handling program;
   wherein the at least one event management device executes the at least one event handler of the event handling program, when the at least one event management device detects a device event, which corresponds with the at least one event handler;
   wherein the at least one event management device comprises:
      a processor;
      a non-transitory memory;
      an input/output component;
      a target compiler, which is configured to compile the event handling program into an event handling executable object for execution on the at least one event management device; and
      a program executor, which is configured to execute the event handling executable object;
   wherein the event handler configuration server further comprises:
      a logical event model, which comprises a plurality of logical events, each comprising at least one available logical event action,
         such that the event handling program references at least one selected logical event from the plurality of logical events, along with at least one selected logical event action from the at least one available logical event action; and
   wherein the at least one event management device further comprises:
      a hardware layer, which provides access to hardware resources, including device events and corresponding device event actions; and
      a logical event mapping, which maps each logical event to an associated device event from the hardware layer, and maps each corresponding logical event action to a corresponding device event action provided by the hardware layer;
      such that the target compiler is configured to use the logical event mapping to replace each logical event with the associated device event and each corresponding logical event action with the corresponding device event action.

2. The system for distributed device event handler configuration of claim 1, wherein the event handler configuration server comprises:
   a) a processor;
   b) a non-transitory memory;
   c) a input/output component; and
   d) a visual program editor, which is configured to edit a graphical representation of the event handling program, such that the visual program editor generates the event handling program from the graphical representation.

3. The system for distributed device event handler configuration of claim 1, wherein the event handling executable object is binary machine code, such that the program executor executes the event handling executable object on the at least one event management device.

4. The system for distributed device event handler configuration of claim 1, wherein the event handling executable object is an intermediate code object, such that the program executor performs a just-in-time compilation of the event handling executable object for execution on the at least one event management device.

5. The system for distributed device event handler configuration of claim 1, wherein the program executor interprets the event handling executable object at run-time.

6. A system for distributed device event handler configuration, comprising:
   a) at least one event management device, which is configured to connect with an event handler configuration server over a network;
   wherein the at least one event management device is configured to receive an event handling program in communication with the event handler configuration server, wherein the event handling program comprises at least one event handler, which is configured to handle device events on the at least one event management device;
   wherein the at least one event management device executes the at least one event handler of the event handling program, when the at least one event management device detects a device event, which corresponds with the at least one event handler;
   wherein the at least one event management device comprises:
      a processor;
      a non-transitory memory;
      an input/output component; and
      a target compiler, which is configured to compile the event handling program into an event handling executable object for execution on the at least one event management device; and
      a program executor, which is configured to execute the event handling executable object;
   wherein the event handling program references at least one selected logical event from a plurality of logical events of a logical event model, along with at least one selected logical event action from at least one available logical event action of the logical event model; and
   wherein the at least one event management device further comprises:
      a hardware layer, which provides access to hardware resources, including device events and corresponding device event actions; and
      logical event mapping, which maps each logical event to an associated device event from the hardware layer, and maps each corresponding logical event action to a corresponding device event action provided by the hardware layer;
      such that the target compiler is configured to use the logical event mapping to replace each logical event with the associated device event and each corresponding logical event action with the corresponding device event action.

7. The system for distributed device event handler configuration of claim 6, wherein the event handling executable object is binary machine code, such that the program executor executes the event handling executable object on the at least one event management device.

8. The system for distributed device event handler configuration of claim 6, wherein the event handling executable object is an intermediate code object, such that the program executor performs a just-in-time compilation of the event handling executable object for execution on the at least one event management device.

9. The system for distributed device event handler configuration of claim 6, wherein the program executor interprets the event handling executable object at run-time.

10. A method for distributed device event handler configuration, comprising:
   a) editing an event handling program, wherein an event handler configuration server is used to create and edit the event handling program, comprising at least one event handler, which is configured to handle device events on at least one event management device;
   b) updating devices, wherein the event handler configuration server updates the at least one event management device with the event handling program;
   c) detecting a device event, wherein the at least one event management device detects a device event, which corresponds with the at least one event handler of the event handling program; and
   d) executing an event handler, wherein the at least one event management device executes the at least one event handler;
   wherein the at least one event management device comprises:
      a processor;
      a non-transitory memory;
      an input/output component;
      a target compiler, which is configured to compile the event handling program into an event handling executable object for execution on the at least one event management device; and
      a program executor, which is configured to execute the event handling executable object;
   wherein the event handler configuration server further comprises:
      a logical event model, which comprises a plurality of logical events, each comprising at least one available logical event action, such that the event handling program references at least one selected logical event from the plurality of logical events, along with at least one selected logical event action from the at least one available logical event action; and
   wherein the at least one event management device further comprises:
      a hardware layer, which provides access to hardware resources, including device events and corresponding device event actions; and
      a logical event mapping, which maps each logical event to an associated device event from the hardware layer, and maps each corresponding logical event action to a corresponding device event action provided by the hardware layer;
   such that the target compiler is configured to use the logical event mapping to replace each logical event with the associated device event and each corresponding logical event action with the corresponding device event action.

11. The method for distributed device event handler configuration of claim 10, wherein the event handler configuration server comprises:
   a) a processor;
   b) a non-transitory memory;
   c) a input/output component; and
   d) a visual program editor, which is configured to edit a graphical representation of the event handling program, such that the visual program editor generates the event handling program from the graphical representation.

12. The method for distributed device event handler configuration of claim 10, wherein the event handling executable object is binary machine code, such that the program executor executes the event handling executable object on the at least one event management device.

13. The method for distributed device event handler configuration of claim 10, wherein the event handling executable object is an intermediate code object, such that the program executor performs a just-in-time compilation of the event handling executable object for execution on the at least one event management device.

14. The method for distributed device event handler configuration of claim 10, wherein the program executor interprets the event handling executable object at run-time.

* * * * *